United States Patent [19]

Azusawa

[11] 4,262,241

[45] Apr. 14, 1981

[54] CONTROL SYSTEM FOR COMMUTATORLESS MOTOR DRIVEN THROUGH FREQUENCY CONVERTER

[75] Inventor: Noboru Azusawa, Hitachi, Japan

[73] Assignee: Hitachi, Ltd., Japan

[21] Appl. No.: 966,027

[22] Filed: Dec. 4, 1978

[30] Foreign Application Priority Data

Dec. 5, 1977 [JP] Japan .............................. 52-145027

[51] Int. Cl.³ .............................................. H02P 5/40
[52] U.S. Cl. .................................. 318/703; 318/722; 318/758; 318/764
[58] Field of Search ....................... 318/703, 720-723, 318/739, 740, 756, 758, 763, 764, 138

[56] References Cited

U.S. PATENT DOCUMENTS

| | | | |
|---|---|---|---|
| 3,780,361 | 12/1973 | Poppinger et al. .................. | 318/721 |
| 3,815,003 | 6/1974 | Wiart ............................... | 318/703 X |
| 4,088,932 | 5/1978 | Okuyama et al. ............... | 318/721 X |
| 4,137,489 | 1/1979 | Lipo .................................. | 318/722 X |

Primary Examiner—Gene Z. Rubinson
Attorney, Agent, or Firm—Craig and Antonelli

[57] ABSTRACT

A control system for a commutatorless motor comprises a frequency converter which includes two graetz-connected thyristor converters and D.C. lines interconnecting the converters, between an A.C. motor and an A.C. power supply. Motoring operation and regenerating operation are selectively effected between the motor and the power supply. In switching the operation mode, one of the converters which has been operated in a recitifier operation mode is first switched to an inverter operation mode, and after it has been confirmed that a control voltage to determine a firing angle of the one converter has been shifted to an inverter region, the other convertor is switched to the rectifier operation mode.

4 Claims, 22 Drawing Figures

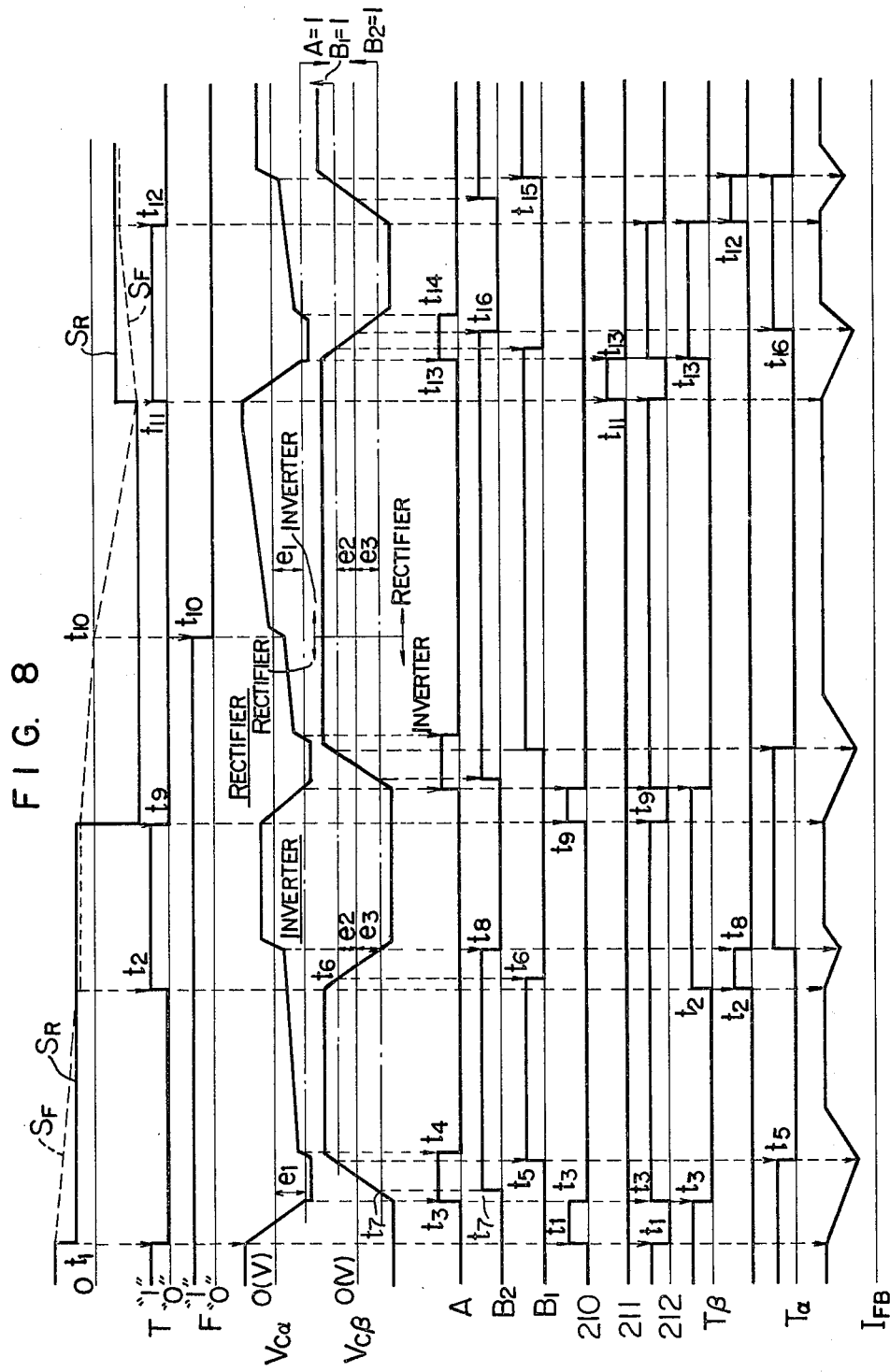

CONTROL SYSTEM FOR COMMUTATORLESS MOTOR DRIVEN THROUGH FREQUENCY CONVERTER

BACKGROUND OF THE INVENTION

The present invention relates to a control system for a commutatorless motor, and more particularly to a control system for a commutatorless motor driven through a frequency converter in which the frequency converter is controlled to effect rapid switching between motoring operation and regenerating operation.

The commutatorless motors to which the present invention is applied are first explained in brief. They can be classified into a D.C. type and an A.C. type depending on the construction of the frequency converter. In the D.C. type, A.C. is converted to D.C. and the D.C. is converted again to A.C. to drive the motor. The D.C. type is equipped with a set of graetz-connected converters for D.C.-A.C. conversion. On the other hand, the A.C. type is equipped with a so-called cyclo-converter and it does not convert A.C. to D.C. but converts A.C. to a variable frequency and variable voltage A.C. to drive the motor. The present invention is applicable to those types of commutatorless motors.

In those motors, the motoring operation is referred to as such a driving state in which a power is fed from the A.C. power supply to the motor to drive it. In the D.C. type, the motoring is realized by operating a converter connected to the power supply (hereinafter referred to as a power supply converter) in a rectifier mode while operating a converter connected to the motor (hereinafter referred to as a motor converter) in an inverter mode. The regenerating mode is referred to as such a driving state in which the power is recovered by the power supply in order to slow down the motor speed. In the D.C. type, the regenerating is realized by operating the power supply converter in the inverter mode while operating the motor converter in the rectifier mode. By way of example, in starting the motor, the motoring operation may be continuously taken and in stopping the motor the regenerating operation may be continuously taken. When the motor speed is set to a small speed, the operation mode must be appropriately switched between the motoring operation and the regenerating operation. More particularly, in order to slow down the motor speed to a changed set speed, the operation mode is switched from the motoring operation to the regenerating operation, and when the changed set speed is reached, the operation mode is again switched to the motoring operation to maintain the changed set speed.

The switching between the motoring operation and the regenerating operation has been effected in the following manner in the conventional commutatorless motor. An example for the D.C. type is explained here.

In the D.C. type, during the motoring operation, the power supply converter is operated in the rectifier mode while the motor converter is operated in the inverter mode. When the operation mode is to be switched to the regenerating mode:

(1) The firing angle of the power supply converter is shifted into an inverter region; and (2) After it has been confirmed that the D.C. current attenuated to substantially zero, the firing angle of the motor converter is shifted into a rectifier operation region.

When the operation mode is to be switched from the regenerating operation to the motoring operation:

(1) The firing angle of the motor converter which has been in the rectifier operation region is shifted to the inverter region; and (2) After it has been confirmed that the D.C. current attenuated to substantially zero, the firing angle of the power supply converter which has been in the inverter region is shifted into the rectifier operation region.

In this manner, the switching between the motoring operation and the regenerating operation is effected. In any event, the phenomenon of "zero D.C. current" is used as a condition for effecting the switching. Although the explanation for the A.C. type is omitted here, it also uses the phenomenon of "substantially zero load current" as a condition for effecting the switching.

However, since the main circuit of the motor includes a large reactor such as a D.C. reactor for the D.C. type and a filtering reactor for the A.C. type, there is included a substantial amount of time delay before the load current decays. Because of the time delay due to the reactor, it has been known that the prior art system required several hundreds milliseconds for the switching.

The large time delay in switching means a slow response in changing the motor speed. That is, after a change-of-speed command has been issued, a dead time of several hundreds milliseconds is unconditionally required before the switching is finished, and it is further later when the motor speed tends to approach the commanded speed as a result of switching. Therefore, more than one second is required before the motor speed finally reaches the commanded speed. Furthermore, since a long time is needed before the effect of switching appears, a speed variance from the commanded speed is large.

Thus, because of such a slow response, the prior art system is not suitable for use with the motor used in the field in which a high precision is required. For example, in a tandem rolling mill, it has been well known that a tension is caused in a material to be rolled if there are speed deviations between the rolls. When the commutatorless motor described above is used as a roll drive motor, a tension is apt to be caused between the rolls because of large speed variance of the motor and it is difficult to recover a zero-tension condition because of slow response of the motor.

While the switching between the motoring operation and the regenerating operation for a constant speed control has been described so far, the same switching is effected in changing the established speed or reversing the motor rotation. The reversal of motor rotation is effected by switching the operation mode from the constant speed control to the regenerating operation to slow down the motor speed, and when the motor speed reaches zero, the motoring operation in reverse direction is started. In order to finish the reversal rapidly, the switching from the regenerating operation to the motoring operation must be made rapidly. Therefore, the switching delay raises a problem in this case too.

SUMMARY OF THE INVENTION

It is an object of the present invention to provide a control system for a commutatorless motor equipped with a frequency converter, which improves a response in switching between the motoring operation and the regenerating operation.

It is another object of the present invention to provide a control system which can attain forcing rapidly.

In order to achieve the above objects, according to the present invention, a commutatorless A.C. motor is driven through an A.C.-A.C. converting (frequency and voltage converting) thyristor converter. In switching a torque direction, the firing angle of a first thyristor which has been in a power-in region is switched from the rectifier conversion region to the inverter conversion region and then the firing angle of a second thyristor which has been in a power-out region is switched from the inverter conversion region to the rectifier conversion region so that the torque direction is reversed, and the second thyristor is operated when the D.C. voltage of the first thyristor has been reversed or the firing angle of the first thyristor has been shifted into the inverter region.

BRIEF DESCRIPTION OF THE DRAWINGS

FIG. 8 illustrates the changes of the outputs shown in FIGS. 5 and 6 with the change of operating condition;

DESCRIPTION OF THE PREFERRED EMBODIMENTS

Figure 1:
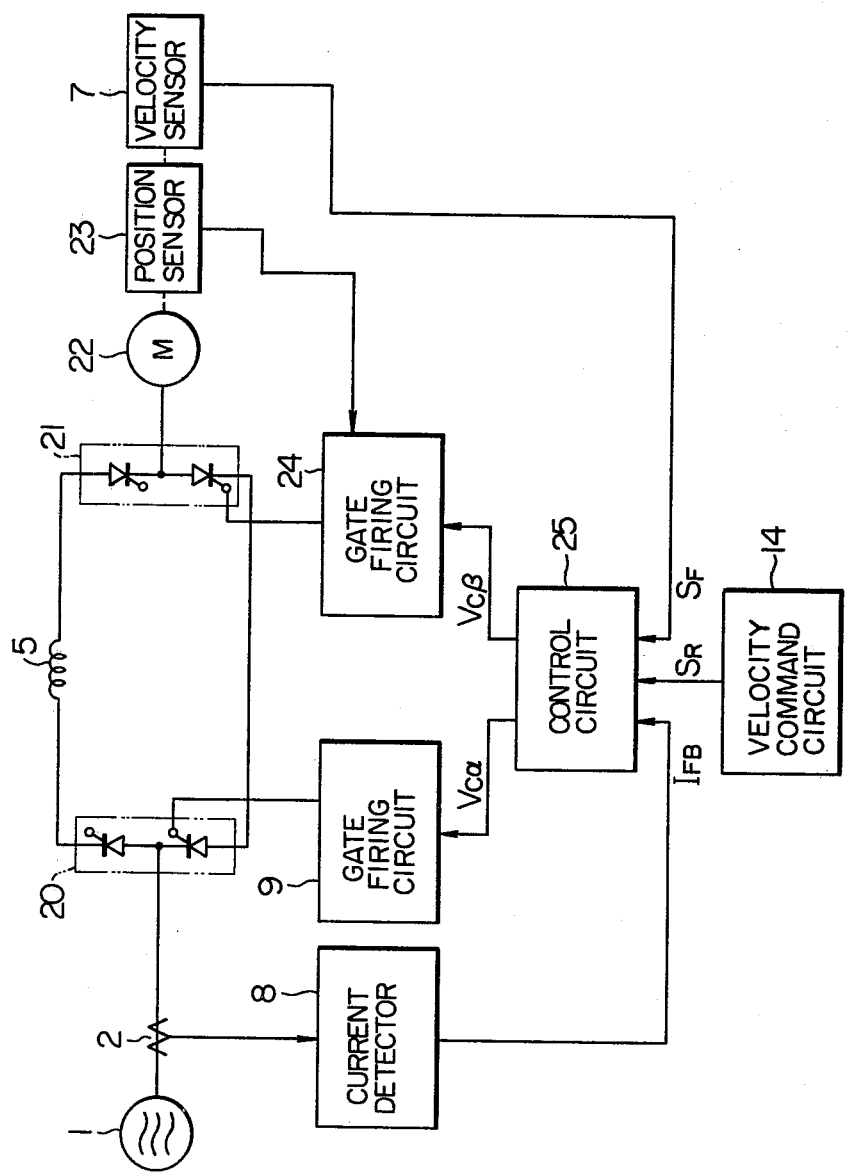
FIG. 1 shows a main circuit configuration of a D.C. type commutatorless motor of the present invention and a control circuit therefor.

FIG. 1 shows a diagram of a main circuit and a control circuit therefor of a D.C. type commutatorless motor in accordance with the present invention. In FIG. 1, reference numeral 1 and 22 denote a 3-phase power supply and a 3-phase motor respectively. A D.C. reactor 5 and converters 20 and 21 constitute a D.C. type frequency converter. While those components are shown as being interconnected through single-wired lines because a main purpose of FIG. 1 is to illustrate a schematic configuration of the main circuit, the converters 20 and 21 are actually interconnected with a graetz connection and the line connecting the converter 20 with the power supply 1 and the line connecting the converter 21 with the motor 22 are 3-phase lines. Reference numerals 2, 8, 23 and 7 denote a current transformer, a current detector, a position sensor and a velocity sensor respectively. A control circuit of the present invention receives a reference velocity signal $S_R$ from a velocity setting circuit 14, a motor velocity signal $S_F$ from the velocity sensor 7 and a current signal $I_{FB}$ from a current detector 8 as input signals to provide control voltage signals $V_{c\alpha}$ and $V_{c\beta}$ to gate firing circuits 9 and 24, respectively. The gate firing circuits 9 and 24 control the control angles $\alpha$ and $\beta$ of the thyristor converters 20 and 21, respectively, in response to the control voltages $V_{c\alpha}$ and $V_{c\beta}$. The gate firing circuits 9 and 24 each contains a variable frequency automatic pulse phase shifter which responds to zero to a rated frequency of the commutatorless motor. Although not shown, the gate firing circuit 9 determines a firing timing using the voltage of the A.C. power supply 1 as a reference phase, and the gate firing circuit 24 determines a firing timing using the output of the position sensor 23 as a reference phase. The gate firing circuits 9 and 24 may be any circuits which can shift a control lagging angle $\alpha$ and a control leading angle $\beta$ to an inverter operation region or a rectifier operation region in response to the control voltage signals $V_{c\alpha}$ and $V_{c\beta}$. Since the circuits 9 and 24 may be of any circuit configuration so long as they meet the above functional requirement, particular circuit configurations of the circuits 9 and 24 are not explained here.

Figure 3A:
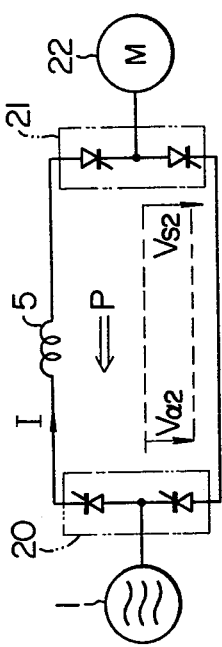
FIGS. 3A to 3C illustrate a procedure of switching the operation mode of the motor of FIG. 1 from the regenerating operation to the motoring operation.
Figure 2A:
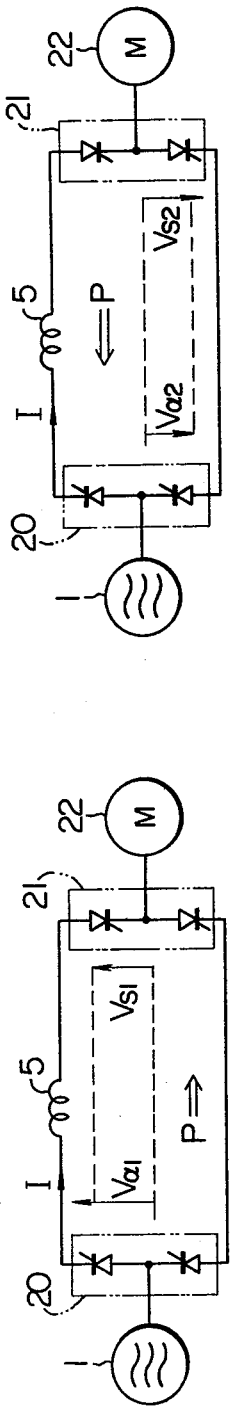
FIGS. 2A to 2C illustrate a procedure of switching the operation mode of the motor shown in FIG. 1 from the motoring operation to the regenerating operation.
Figure 2B:
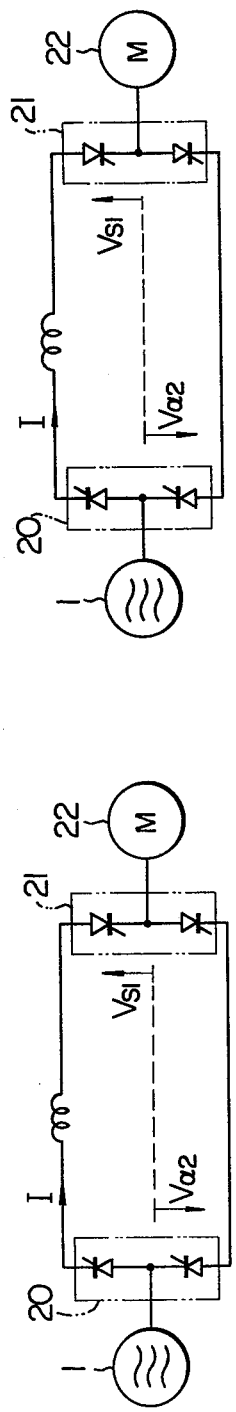
Figure 2C:
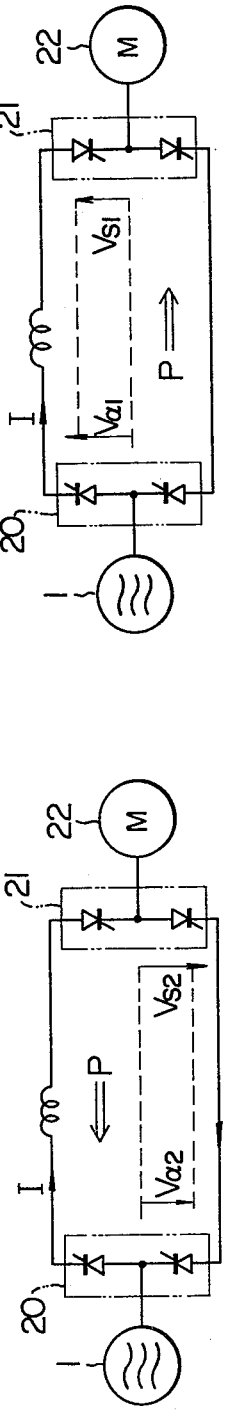

The D.C. type commutatorless motor of the present invention is constructed as shown and described above. The switching of the operation mode from the motoring operation to the regenerating operation is effected in a manner shown in FIGS. 2A to 2C and the switching from the regenerating operation to the motoring operation is effected in a manner shown in FIGS. 3A to 3C. In the motoring operation, as shown in FIG. 2A, the thyristor converter 20 is operated in the rectifier operation mode to produce a D.C. output voltage $V_{\alpha 1}$ while the thyristor converter 21 is operated in the inverter operation mode by a D.C. input voltage $V_{S1}$ ($V_{\alpha 1} > V_{S1}$). Consequently, a power is supplied from the A.C. power supply 1 to the commutatorless motor 22. To switch the operating mode to the regenerating operation, the thyristor converter 20 is first switched to the inverter operation mode so that the D.C. voltage of the thyristor converter 20 assumes a voltage $V_{\alpha 2}$ of the opposite polarity as shown in FIG. 2B, and after it has been confirmed that the D.C. voltage of the thyristor converter 20 has been reversed as the value $V_{\alpha 2}$ of the opposite polarity, the thyristor converter 21 is switched to the rectifier operation mode to change the D.C. voltage thereof to the value $V_{S2}$ of the opposite polarity to $V_{S1}$, as shown in FIG. 2C, where $V_{S2} > V_{\alpha 2}$. Thus, the converter 20 is now in a backward converting mode and the converter 21 is now in a forward converting mode. Accordingly, the operation mode has been switched to the regenerating operation in which the direction of the current flowing in the D.C. reactor 5 remains unchanged but the power is fed from the commutatorless motor 22 to the A.C. power supply 1.

Figure 3B:
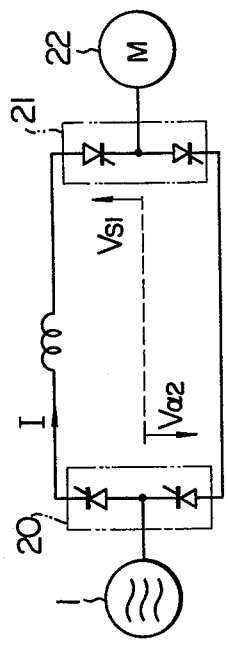
Figure 3C:
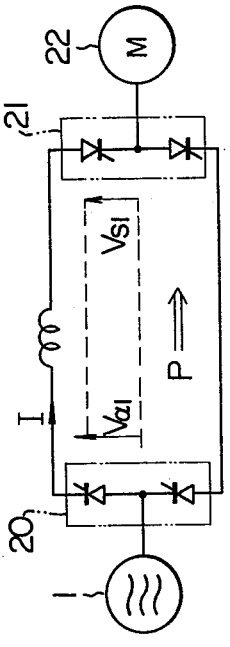

On the other hand, when the operation mode is to be switched from the regenerating operation (FIG. 3A) to the motoring operation, the thyristor converter 21 is switched to the inverter operation mode so that the D.C. voltage $V_{s2}$ of the thyristor converter 21 is changed to the voltage $V_{s1}$ which is opposite in polarity to $V_{s2}$ as shown in FIG. 3B, and after it has been confirmed that the polarity of the D.C. voltage of the thyristor converter 21 has been reversed, the thyristor converter 20 is switched to the rectifier operation mode to change the D.C. voltage thereof to the voltage $V_{\alpha 1}$ which is opposite in polarity to $V_{\alpha 2}$ as shown in FIG. 3C, where $V_{\alpha 1} > V_{s1}$. Thus, the operation mode has been switched to the motoring operation in which the direction of current remains unchanged but the power is fed from the A.C. power supply 1 to the commutatorless motor 22.

In summary, like in the prior art, the first converter which has been operated in the rectifier operation mode is first switched to the inverter operation mode and then the second converter which has been operated in the inverter operation mode is switched to the rectifier operation mode, but the condition on which the second converter is triggered is not the "zero-D.C. current condition" but the "reversal of the D.C. voltage of the first converter" or the "shift of the firing angle of the first converter into the inverter region". Thus, according to the present invention, the switching response is improved because the delay time included in triggering the converter is smaller than that of the prior art in which the D.C. current is identified.

Figure 4:
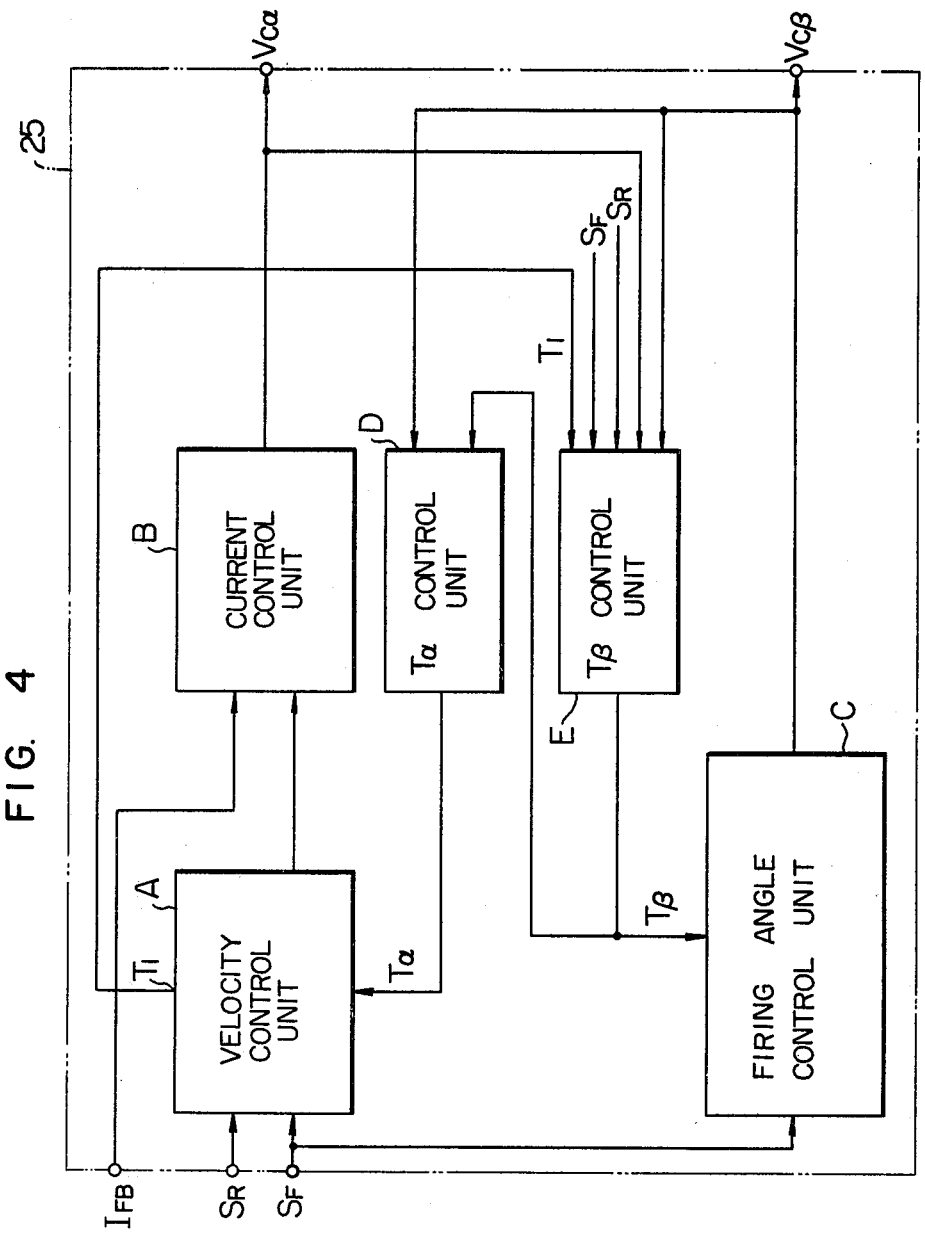
FIG. 4 shows a schematic configuration of a control unit 25 shown in FIG. 1 in accordance with the present invention.

The present invention described above can be realized by appropriately varying the control voltages $V_{c\alpha}$ and $V_{c\beta}$ in the control circuit 25 of FIG. 1. Referring to FIG. 4, a schematic configuration of the control circuit 25 of the present invention will now be explained.

As shown in FIG. 4, the control circuit 25 receives the current signal $I_{FB}$, the reference velocity signal $S_R$ and the motor velocity signal $S_F$ as its input signals and supplies the control voltage signals $V_{c\alpha}$ and $V_{c\beta}$ to the gate firing circuit 9 and the gate firing circuit 24 respectively. The signal $V_{c\alpha}$ is produced by a circuit comprising cascade-connected velocity control unit A and current control unit B. The signal $V_{c\alpha}$ is a signal for obtaining a load current (for motoring operation) or a regenerating current (for regenerating operation) which is necessary to make the motor velocity $S_F$ to be equal to the reference value $S_R$. The signal $V_{c\beta}$ is produced by a firing angle control unit C and controls a firing angle $\beta$ in accordance with the motor velocity $S_F$. Control units D and E respectively produce switching signals $T_\alpha$ and $T_\beta$ for switching the operation mode between the motoring operation and the regenerating operation.

Figure 5:
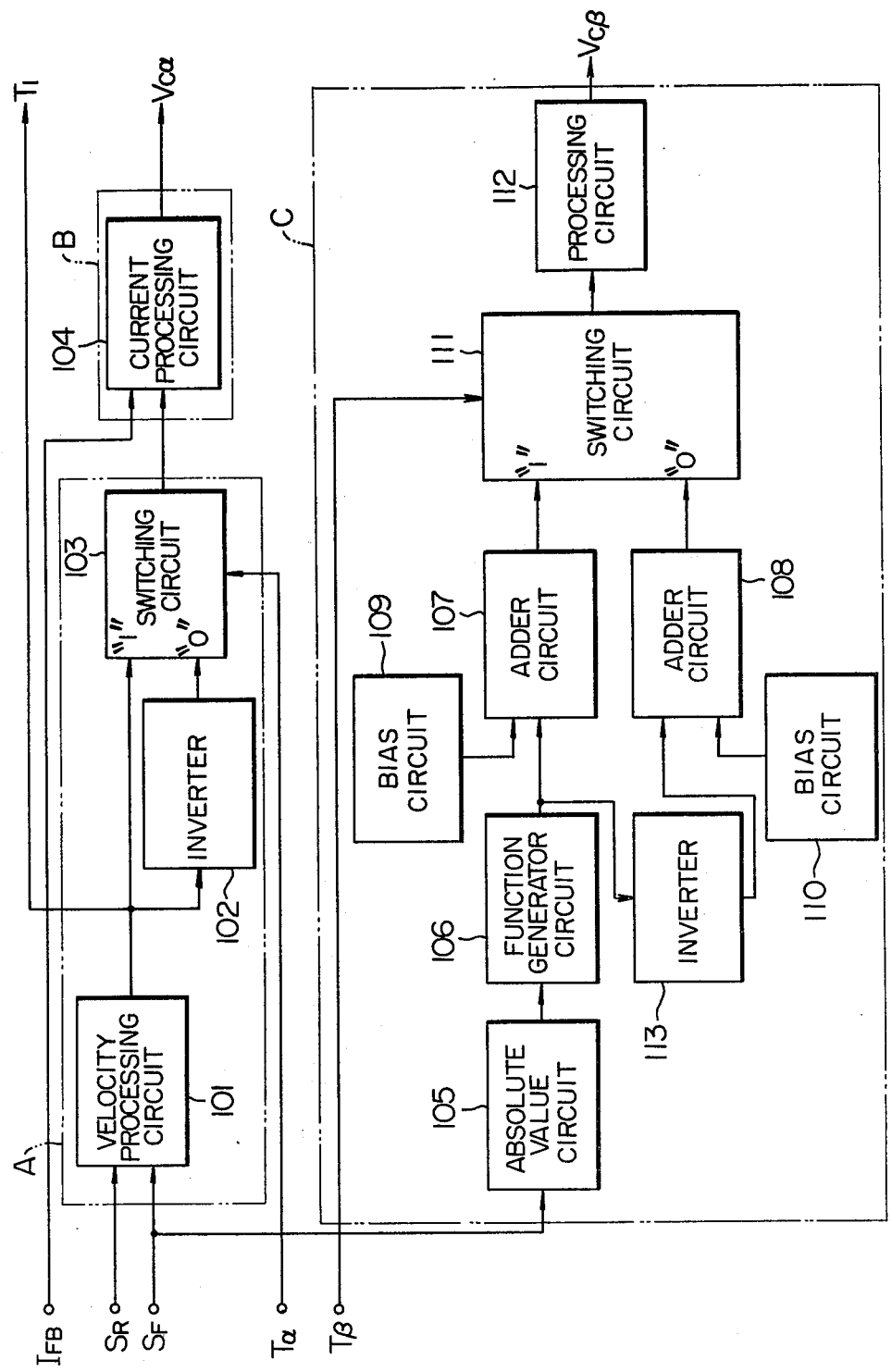
FIG. 5 shows a specific configuration of a speed control unit A, a current control unit B and a firing angle control system C shown in FIG. 4.

Referring to FIG. 5, specific constructions of the control units A, B and C are explained. The velocity control unit A comprises a velocity processing circuit 101, an inverter circuit 102 and a switching circuit 103 and the current control unit B comprises a current processing circuit 104. The velocity processing circuit 101 receives the output $S_R$ of the velocity setting circuit 14 and the output $S_F$ of the velocity sensor 7 as its input signals and make proportion-integration operation on them such that the velocity of the commutatorless motor becomes equal to $S_R$. The inverter circuit 102 inverts the polarity of the output of the velocity processing circuit 101. The switching circuit 103 receives the output of the velocity processing circuit 101 and the output of the inverter circuit 102 and it gates the output of the velocity processing circuit 101 during a forward torque period (the period during which the switching signal $T_\alpha$ is "1") and gates the output of the inverter circuit 102 during a backward torque period (the period during which the switching signal $T_\alpha$ is "0"). The current processing circuit 104 receives a current command signal which is the output of the switching circuit 103 and the output $I_{FB}$ of the current detector 8 and makes arithmetic operation on them such that a current indicative of a velocity difference $S_R$-$S_F$ flow so as to produce the signal $V_{c\alpha}$ which is an input signal to the gate firing circuit 9. As will be described later, the control units A and B control the control voltage $V_{c\alpha}$ in accordance with the difference between $S_R$ and $S_F$ such that the thyristor 20 is operated in the rectifier region during the forward torque period and that the thyristor 20 is operated in the inverter region during the backward torque period. For example, when $V_{c\alpha} > 0$, the thyristor is operated in the rectifier region, and when $V_{c\alpha} < 0$, it is operated in the inverter region. If an acceleration in the forward rotation is defined as the forward torque, a deceleration in the backward rotation is also the forward torque. Accordingly, the deceleration in the forward rotation and the acceleration in the backward rotation are backward torque. In the forward torque period, $S_R - S_F > 0$ and the output of the velocity processing circuit 101 is positive, and in the backward torque period, $S_R - S_F < 0$ and the output of the circuit 101 is negative.

Figure 7A:
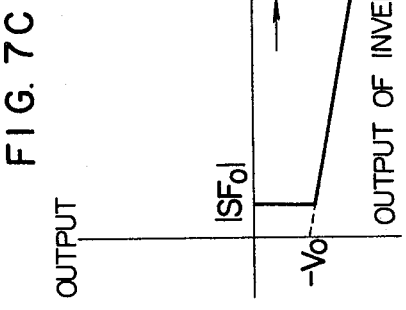
FIGS. 7A to 7F show the respective output characteristics at various parts of the firing angle control unit C shown in FIG. 5.
Figure 7B:
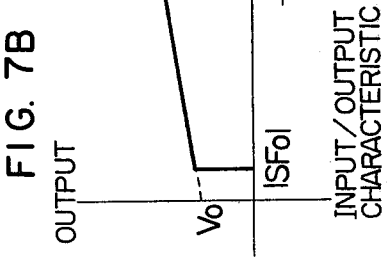
Figure 7C:
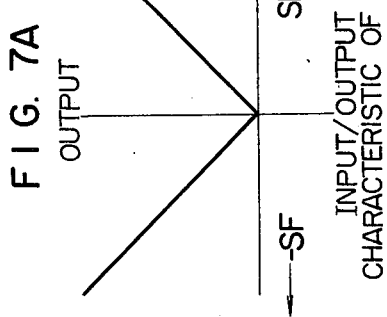
Figure 7D:
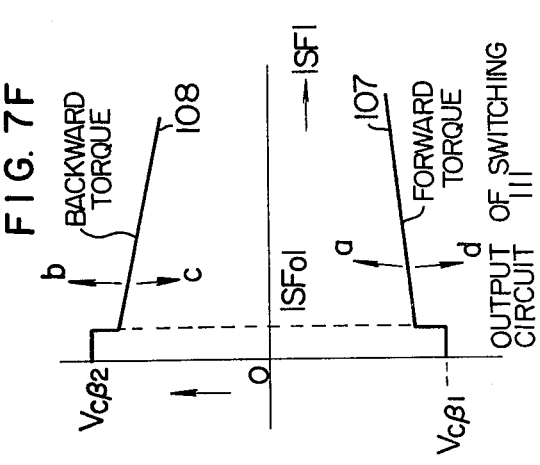
Figure 7E:
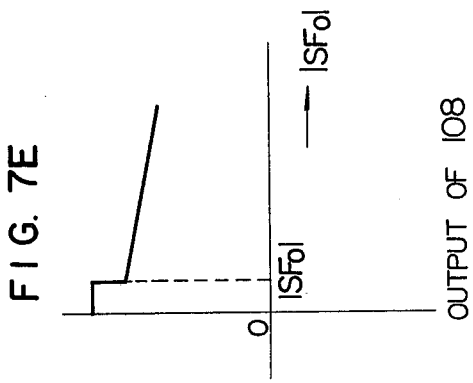
Figure 7F:
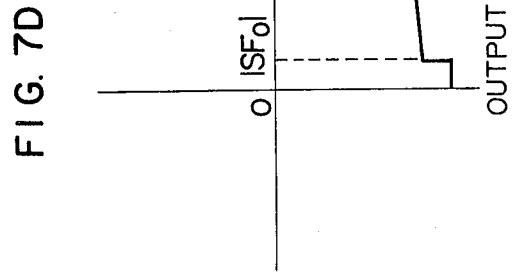

On the other hand, the firing angle control unit C for the motor converter 21 comprises an absolute value circuit 105, a function generator circuit 106, an inverter circuit 113, bias circuits 109 and 110, adder circuits 107 and 108, a switching circuit 111 and a processing circuit 112. The output $S_F$ of the velocity detector 7 is applied to the absolute value circuit 105 which produces an absolute value signal $|S_F|$ as shown in FIG. 7A. The function generator circuit 106 produces zero output until the signal $|S_F|$ exceeds a predetermined value $|S_{FO}|$, when it produces a signal having a value of "$V_o + k \cdot |S_F|$" (where $V_o$ is a constant and k is a proportional constant). FIG. 7B shows an output characteristic of the circuit 106. The inverter circuit 113 inverts the output of the function generator circuit 106 and produces a signal having a value of "$-(V_o + k \cdot |S_F|)$" as shown in FIG. 7C. The bias circuit 109 applies a negative voltage $-V_1$ to the adder circuit 107 and the bias circuit 110 applies a positive voltage $V_2$ to the adder circuit 108. The adder circuit 107 adds the respective outputs of the bias circuit 109 and the function generator circuit 106 together and produces a signal having a value of "$V_o + k \cdot |S_F| - V_1$" which is an input signal to the gate firing circuit 24 when the forward torque appears. The output of the adder circuit 107 is shown in FIG. 7D. The adder circuit 108 adds the respective outputs of the bias circuit 110 and the inverter circuit 113 together and produces a signal having a value of "$V_2 - V_o - k \cdot |S_F|$" which is an input signal to the gate firing circuit 24 when the backward torque appears. The output of the adder circuit 108 is shown in FIG. 7E. The switching circuit 111 responds to the forward-/backward torque switching signal $T_\beta$ to gate the output of the adder circuit 107 in the forward torque period ($T_\beta = 1$) and gate the output of the adder circuit 108, in the backward torque period ($T_\beta = 0$). The resulting velocity characteristic of the output of the switching circuit 111 is shown in FIG. 7F, in which an abscissa represents an absolute value of the motor velocity and an ordinate represents the control voltage $V_{c\beta}$. While the firing angle of the thyristor 21 is determined in accordance with $V_{c\beta}$, the relation of the firing angle relative to $V_{c\beta}$ differs between the forward rotation period and the backward rotation period as will be more fully described later. In the forward rotation, the voltage $V_{c\beta2}$ ($V_{c\beta2}>0$) corresponds to a control leading angle $\beta=180°$ (control lagging angle $\alpha=0°$) for the thyristor 21 and the voltage $V_{c\beta1}$ ($V_{c\beta1}<0$) corresponds to $\beta=0$ ($\alpha=180°$). Accordingly, when the control voltage $V_{c\beta}$ is positive, the thyristor 21 is operated as the rectifier, and when $V_{c\beta}<0$, it is operated as the inverter. When the switching signal $T_\beta$ is "1" to select the forward torque operation (motoring), the thyristor 21 is operated as the inverter, and when the switching signal $T_\beta$ is "0" to select the backward torque operation (regenerating), it is operated as the rectifier.

On the other hand, in the backward rotation, the control lagging angle $\alpha$ is controlled by $V_{c\beta}$. That is, when $V_{c\beta}>0$, the thyristor is operated as the inverter ($90°<\alpha<180°$) and when $V_{c\beta}<0$ it is operated as the rectifier ($0°<\alpha<90°$). When $T_\beta$ is "1" to start the forward torque operation (regenerating) with backward rotation, the output of the adder circuit 107 is gated to operate the thyristor 21 as the rectifier, and when $T_\beta$ is "0" to start the backward torque operation (motoring) with the backward rotation, the output of the adder circuit 108 is gated to operate the thyristor 21 as the inverter.

While the signal $|S_{Fo}|$ is set to 5–10% of a rated velocity, the thyristor 21 which is operating as the inverter does not commutate because of insufficient counter electromotive force in such a low speed region. Accordingly, a well-known forced commutator circuit (not shown) is provided in the circuit of the thyristor 20 to supply an intermittent current to rotate the motor. In this case, in order to maximize the torque produced by the motor to attain rapid increase of the speed, the firing angle $\beta$ of the inverter is set to zero. The processing circuit 112 functions as a first order time lag circuit which, when it receives an abruptly changing input signal, produces a slowly changing output signal in order to prevent undesired misoperation of the gate firing circuit.

The firing angle control unit C functions to control an angle margin depending on the velocity $S_F$.

The velocity control unit A, the current control unit B and the firing angle control unit C thus constructed function to cause the switching circuit 103 to gate the output of the velocity processing circuit 101 and cause the switching circuit 111 to gate the output of the adder circuit 107 in the forward torque period to produce $V_{c\alpha}$ and $V_{c\beta}$, respectively. In the backward torque period, the outputs of the inverter circuit 102 and the adder circuit 108 are gated to produce $V_{c\alpha}$ and $V_{c\beta}$ respectively. The switching of the switching circuits 103 and 111 are controlled by $T_\alpha$ and $T_\beta$, respectively, which are produced by a logic shown in FIG. 6.

Figure 6:
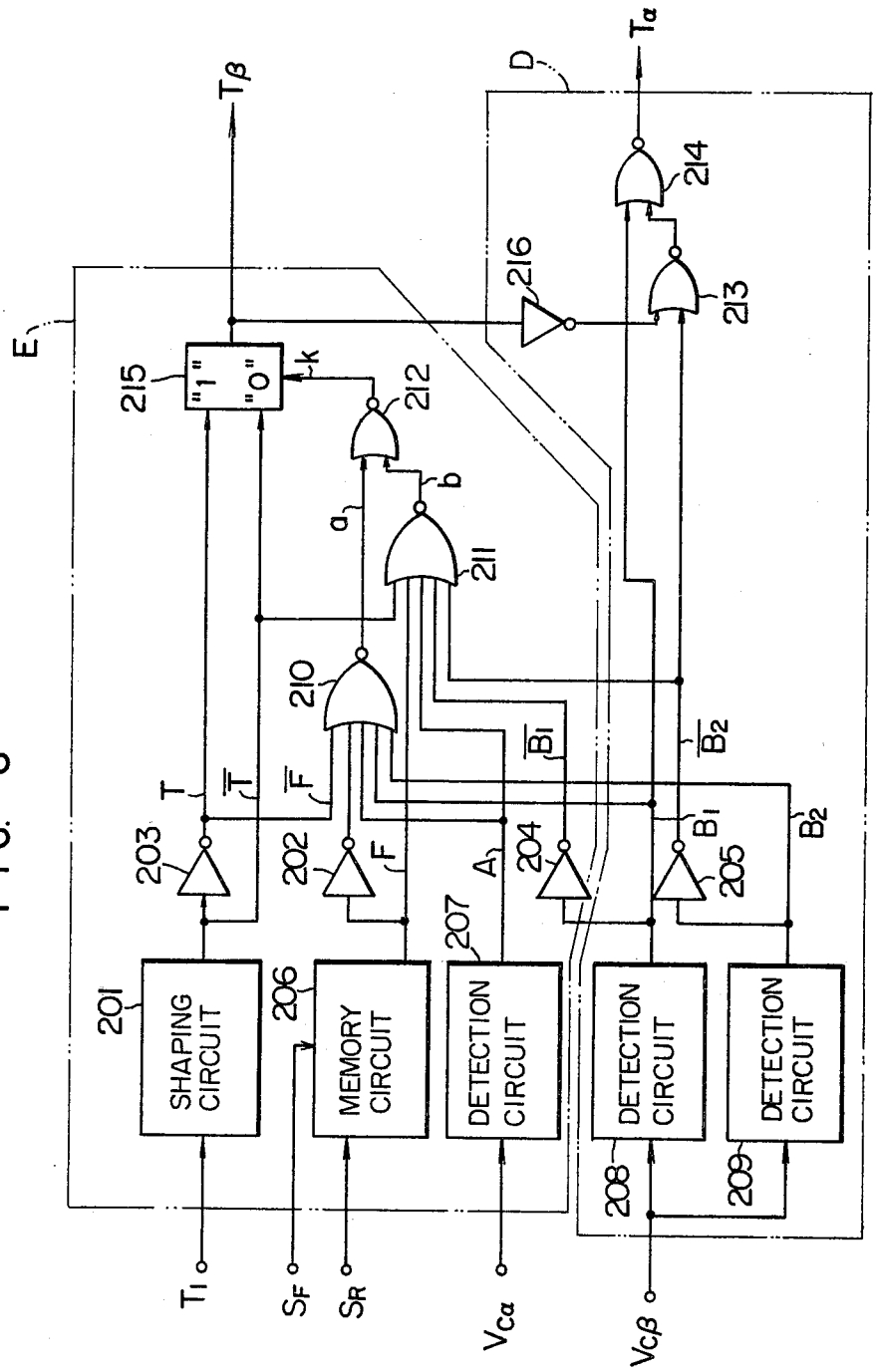
FIG. 6 shows a specific configuration of a $T_\alpha$ control unit D and a $T_\beta$ control unit E shown in FIG. 4.

Referring to FIG. 6, the $T_\alpha$ control unit D receives the output $T_\beta$ of the $T_\beta$ control unit E and the control voltage $V_{c\beta}$ to produce the switching signal $T_\alpha$. When $T_\alpha$ is "1", the switching circuit 103 gates the output of the velocity processing circuit 101, and when $T_\alpha$ is "0", it gates the output of the inverter circuit 102. The $T_\beta$ control unit receives the velocity error signal $T_1$ which is the output of the velocity processing circuit 101, the motor velocity signal $S_F$, the reference velocity signal $S_R$, the control signal $V_{c\alpha}$ and the control voltage $V_{c\beta}$ so as to make a logical operation on them to produce the output signal $T_\beta$. When $T_\beta$ is "1", the switching circuit 111 gates the output of the adder circuit 107, and when $T_\beta$ is "0", it gates the output of the adder circuit 108.

Before explaining the operation of the circuit, the components of the circuit will be briefly explained. Reference numerals 203, 202, 204, 205 and 216 denote inverter circuits, and the complementary signal pairs are represented by bar codes such as (T, $\overline{T}$), (F, $\overline{F}$), (B$_1$, $\overline{B}_1$) and (B$_2$, $\overline{B}_2$). Reference numerals 210, 211, 212, 213 and 214 denote NOR circuits each of which produces a "1" output when all of the inputs thereto are "0". A switching circuit 215 controlled by the output of the NOR circuit 212 gates the signal T as the signal $T_\beta$ when the output of the NOR circuit 212 is "1" and gates the signal $\overline{T}$ when the latter is "0". Since various symbols are used in FIG. 6, the meanings of those symbols are listed below in order to make the understanding easy.

TABLE

| Symbols | Meaning |
|---|---|
| $T_1$ | Velocity error signal $T_1 = S_R - S_F$ |
| T | Signal which is "1" in forward torque period. |
| $\overline{T}$ | Signal which is "1" in backward torque period. |
| F | Signal which is "1" in forward rotation period. |
| $\overline{F}$ | Signal which is "1" in backward rotation period. |
| $V_{c\alpha}$ | Control voltage for power supply thyristor 20 |
| A | Signal which is "1" when control voltage $V_{c\alpha}$ is below negative voltage $e_1$ (inverter region) |
| $V_{c\beta}$ | Control voltage for motor thyristor 21 |
| $B_1$ | Signal which is "1" when control voltage $V_{c\beta}$ is above positive voltage $e_2$ (rectifier region) |
| $\overline{B}_1$ | Inverted signal of $B_1$ |
| $\overline{B}_2$ | Inverted signal of $B_2$ |
| $B_2$ | Signal which is "1" when control voltage $V_{c\beta}$ is below negative voltage $e_3$ (inverter region) |

A shaping circit 201 discriminates positive or negative output of the velocity processing circuit 101 and it produces the "1" output $\overline{T}$ in the backward torque period. The inverter circuit 213 inverts the output of the shaping circuit 201 to produce the "1" output T in the forward torque period. A memory circuit 206 receives the signals $S_F$ and $S_R$ and produces the "1" signal F in the forward rotation period. For example, the signal F changes from "1" to "0" when the output $S_R$ of the velocity setting circuit 14 changes from positive to negative and the velocity absolute value $S_F$ reaches zero, and changes from "0" to "1" when the output of the velocity setting circuit 14 changes from negative to positive and the velocity absolute value $|S_F|$ reaches zero. The inverter circuit 202 produces the inverted signal $\overline{F}$ of the output F of the memory circuit 206. A detection circuit 207 detects when the output $V_{c\alpha}$ of the current processing circuit 104 falls below a negative voltage $e_1$ to produce a "1" signal A. When $V_{c\alpha}$ is negative, the thyristor 20 is operated in the inverter mode. Therefore, the change of the signal A to "1" state means that the thyristor 20 is switched from the rectifier mode to the inverter mode. A detection circuit 208 detects when the output $V_{c\beta}$ of the processing circuit 112 rises above a positive voltage $e_2$ to produce the "1" signal $B_1$. The inverter circuit 204 produces the inverted signal $\overline{B}_1$. A detection circuit 209 detects when the output $V_{c\beta}$ rises above a negative voltage $e_3$ to produce the "1" signal $B_2$. The inverter circuit 205 produces the inverted signal $\overline{B}_2$. The voltage $e_1$, $e_2$ and $e_3$ are set in the vicinity of the control voltage (0 volt) corresponding to the firing angles $\alpha$ and $\beta$ of 90°, e.g. ±0.5 volts.

Logical decision is made based on the above inputs. The output k of the NOR circuit 212 is represented by the following logical expression where a represents the output of the NOR circuit 210 and b represents the output of the NOR circuit 211.

$$a = \overline{T + \overline{F} + A + B_1 + B_2} \quad (1)$$
$$= \overline{T} \cdot F \cdot \overline{A} \cdot \overline{B_1} \cdot \overline{B_2}$$

$$b = \overline{\overline{T} + F + A + \overline{B_1} + \overline{B_2}} \quad (2)$$
$$= T \cdot \overline{F} \cdot \overline{A} \cdot B_1 \cdot B_2$$

$$k = \overline{a + b} \quad (3)$$
$$= \overline{\overline{T + \overline{F} + A + B_1 + B_2} + \overline{\overline{T} + F + A + \overline{B_1} + \overline{B_2}}}$$
$$= (T + \overline{F} + A + B_1 + B_2) \cdot (\overline{T} + F + A + \overline{B_1} + \overline{B_2})$$

On the other hand, $T_\alpha$ can be represented by the following logical expression:

$$T_\alpha = \overline{\overline{T_\beta + \overline{B}_2} + B_1} \quad (4)$$
$$= (\overline{T_\beta} + \overline{B_2}) \cdot \overline{B_1}$$

Operational waveforms at various points in FIGS. 5 and 6 when the operation mode is switched between the motoring operation and the regenerating operation are shown in FIG. 8.

The operation when the operation mode is switched from the operation mode of $S_R \geq S_F$ to the operation mode of $S_r < S_F$ at a time $t_1$ in the forward rotation period is first explained. Since the output T of the inverter circuit 213 is "1" in the forward torque period as shown in the Table, it is "1" in the forward acceleration period, that is when $S_R \geq S_F$. When the condition of $S_R \geq S_F$ is restored at a time $t_2$, the output T again assumes "1". The inverted signal $\overline{T}$ is, of course, the inversion of the signal T although it is not shown in FIG. 8. Like (T, $\overline{T}$), the complementary signal pairs (F, $\overline{F}$), ($B_1$, $\overline{B}_1$) and ($B_2$, $\overline{B}_2$) are also shown for only F, $B_1$ and $B_2$, in FIG. 8. The signal F is "1" in the forward rotation period.

The signals $V_{c\alpha}$ and $V_{c\beta}$ are set to the values which cause the thyristor 20 to operate as the rectifier and the thyristor 21 to operate as the inverter in the forward rotation motoring operation before the time $t_1$. That is, $V_{c\alpha}$ is positive and $V_{c\beta}$ is negative. The voltage $V_{c\alpha}$ changes to negative when the condition of $S_R < S_F$ occurs at the time $t_1$. The output of the velocity processing circuit 101 (FIG. 5) changes to a negative reference current signal so that the current processing circuit 104 rapidly decreases the load current to change the $V_{c\alpha}$ to a signal for the inverter region (i.e. $V_{c\alpha} < 0$). On the other hand, $V_{c\beta}$ is changed to a signal for the rectifier region (i.e. $V_{c\beta} < 0$) in the following manner.

The condition of $V_{c\beta} > 0$ occurs when the signal $T_\beta$ in FIG. 5 changes from "1" to "0" to cause the switching circuit 111 to give the output of the adder circuit 108. As will be explained with reference to FIGS. 6 and 8, $T_\beta$ is converted to the following manner.

First, after the time $t_1$ when the condition of $S_R < S_F$ occurs, $V_{c\alpha}$ rapidly becomes negative (to produce the inverter operation signal) as described above. When the condition of $V_{c\alpha} < e_1$ occurs at a time $t_3$, the signal A assumes "1". Before the time $t_3$, $V_{c\beta}$ remains negative and both $B_1$ and $B_2$ are "0". Under this condition, the signal a which is the output of the NOR circuit 210 is "1" when the five inputs $\overline{T}$, F, $\overline{A}$, $\overline{B}_1$ and $\overline{B}_2$ are all "1" as is seen from the equation (1). In other words, it produces the "1" output during a time period from the change of the output T of the inverter circuit 213 from "1" to "0" to the change of the output A of the detection circuit 207 from "0" to "1" when the forward rotation forward torque operation is changed to the backward torque operation. This period corresponds to the time period between $t_1$ and $t_3$ shown in FIG. 8.

On the other hand, the output b of the NOR circuit 211 defined by the equation (2) is "0" because one input F thereto is "0" so long as the motor is rotating forward. As a result, the output k of the NOR circuit 212 is "0" only during the period ($t_1$-$t_3$) in which the output of the NOR circuit 210 is "1".

In the switching circuit 215 of FIG. 6, the output T is equal to $T_\beta$ when K<1 and the output T is equal to $T_\beta$ when k=0. On the other hand when k=1 before the time $t_1$, the output T is "1" and when k=0 in the period of $t_1$-$t_3$, the output $\overline{T}$ is "1". As a result, the output $T_\beta$ becomes "0" only when the condition of k=1 is restored at the time $t_3$. As a result, the switching circuit 111 gates the output of the adder circuit 108 to rapidly shift $V_{c\beta}$ to the rectifier region.

As described above, when the condition of $S_R < S_F$ occurs and $V_{c\alpha}$ decreases to enter the inverter region, the output $T_\beta$ changes so that $V_{c\beta}$ enters the rectifier region. As $V_{c\beta}$ changes after the time $t_3$, the respective outputs $B_1$ and $B_2$ of the circuits 208 and 209 which respectively receive $V_{c\beta}$ as their inputs also change and become "1" at times $t_5$ and $t_7$, respectively.

The other switching signal $T_\alpha$ is produced in response to the signals $B_1$, $\overline{B}_2$ and $\overline{T}_\beta$ so as to control the switching circuit 103 when the equation (4) is "0" to gate the output of the inverter circuit 102. As seen from the equation (4), the condition of $T_\alpha = 0$ occurs in either case where $\overline{T}_\beta = 0$ and $\overline{B}_2 = 1$ (that is $T_\beta = 1$ and $B_2 = 1$) and where $\overline{B}_1 = 0$ (that is $B_1 = 1$). In FIG. 8, $B_1$ is "1" at the time $t_5$ so that $T_\alpha$ becomes "0" to gate the output of the inverter circuit 102. At this time, the output of the inverter circuit 102 is positive because it is the inversion of the negative output ($S_R - S_F < 0$) of the velocity processing circuit 101. The current processing circuit 104 produces the control voltage signal $V_{c\alpha}$ which renders the system current $I_{FB}$ to become equal to a target current signal (the output of the inverter circuit 102). $V_{c\alpha}$ is negative at this time and hence the thyristor 20 is operated as the inverter. The regeneration control mode at this time is shown in FIG. 2C and the thyristor 20 is operated as the inverter in order to render the $I_{FB}$ to be equal to the target current which depends on "$S_R - S_F$" in the processing circuit 104 becomes the D.C. current I is determined by the difference "$V_{s2} - V_{\alpha2}$" between the voltages across the respective thryistors.

As described above, in the present system, the switching from the forward rotation motoring operation (FIG. 2A) to the regenerating operation (FIG. 2C) as shown in FIG. 2 is effected. According to the present system, since the thyristor 21 which has been operated in the inverter operation mode is switched to the rectifier operation mode in response to the shift of the control voltage $V_{c\alpha}$ for the thyristor 20 which has been operated in the rectifier operation mode to the inverter operation region, the response is improved over the prior art system. In the present system, the D.C current $I_{FB}$ decreases transiently, but before $I_{FB}$ reaches zero, the thyristors 21 and 20 are switched to the rectifier and inverter modes respectively to carry out the current control so that the D.C. current is immediately recovered. By the way, while the prior system (in which the inverter is switched to the rectifier after the detection of $I_{FB}=0$) required switching time of one hundred and several tens milliseconds, the present system requires only 50—60 milliseconds.

Referring to FIG. 8, the switching from the forward rotation regenerating operation to the motoring operation is explained. It is assumed that as a result of the regenerating operation in which the thyristor 21 is operated in the rectifier mode and the thyristor 20 is operated in the inverter mode, $S_F$ has decreased and the condition of $S_R > S_F$ has occurred at the time $t_2$. In this case, the thyristor 21 is first switched to the inverter operation mode and than the thyristor 20 is switched to the rectifier mode to switch the operation mode to the motoring operation.

Before the time $t_2$, the output of the NOR circuit 212 is "1" and the switching circuit 215 produces the "0" output T as $T_\beta$. Because of $T_\beta = 0$, the output of the adder circuit 108 is gated so that the thyristor 21 is operated in the rectifier operation mode. At the time $t_2$, when the condition of $S_R > S_F$ occurs, the output signal T of the inverter circuit 213 changes to "1" and $T_\beta$ changes to "1". As a result, $V_{c\beta}$ rapidly becomes negative and the inverter operation mode starts. As $V_{c\beta}$ changes, the signals $B_1$ and $B_2$ change to "0" at times $t_6$ and $t_8$, respectively. $T_\alpha$, which is represented by the equation (4), assumes "1" when at least one of $\overline{T}_\beta$ and $\overline{B}_2$ is "1" and $\overline{B}_1$ is "1". This condition occurs after the time $t_8$ when the control voltage $V_{c\beta}$ for the thyristor 21 which has been operated in the rectifier operation mode shifts to the inverter region ($V_{c\beta} < e_3$). After it has been confirmed that $V_{c\beta}$ has shifted to the inverter region, $T_\alpha$ changes to "1" and the switching circuit 103 gates the output of the velocity processing circuit 101 so that $V_{c\alpha}$ is determined. After the switching, the D.C. current I is determined depending on the differential voltage "$V_{\alpha 1} - V_{sI}$" between $V_{sI}$ and $V_{\alpha I}$ as shown in FIG. 3C. $V_{c\alpha}$ is set to the rectifier region in order to control the $I_{FB}$ such that it becomes equal to the target current determined by "$S_R - S_F$".

The backward rotation of the motor is now considered. When the condition of $S_R < 0$ occurs at a time $t_9$, the signal T, which is "1" in the forward torque period, now changes to "0". The signal F, which is "1" when the velocity is positive, changes to "0" at a time $t_{10}$ as a result of the speed-down and remains in the "0" state in the backward rotation period. Since the velocity error "$S_R - S_F$" becomes negative, $V_{c\alpha}$ rapidly becomes negative to enter the inverter region. The changes of the signals T, F and $V_{c\alpha}$ in this case are quite the same as those when the condition of $S_R < S_F$ occurred at the time $t_1$, and the other signals $V_{c\beta}A$, $B_1$ and $B_2$ change in the same manner as they changed after the time $t_1$ when the forward rotation motoring operation was changed to the regenerating operation. That is, $V_{c\alpha}$ is changed to be negative to operate the thyristor 20 in the inverter operation mode, and after it has been confirmed that $V_{c\alpha}$ has become negative, $V_{c\beta}$ is changed to be positive to operate the thyristor 21 in the rectifier operation mode.

In this manner, the deceleration in the forward rotation is effected and after the time $t_{10}$, the backward rotation starts. As is well known, it is necessary to change the phase sequence of the motor in order to switch the motor from the forward rotation to the backward rotation. This may be achieved by changing the firing sequence of the motor converter 21, and it is carried out in the gate firing circuit 24. Before the time $t_{10}$, since the thyristor 20 is operated in the inverter operation mode and the thyristor 21 is operated in the rectifier mode, $V_{c\alpha}$ is negative and $V_{c\beta}$ is positive. In order to reverse the rotation, the thyristor 20 must be operated in the rectifier operation mode ($V_{c\alpha} > 0$) and the thyristor 21 must be operated in the inverter operation mode ($V_{c\beta} < 0$). This is achieved to operate the thyristor 21 as the inverter when $V_{c\beta} > 0$ and as the rectifier when $V_{c\beta} < 0$ in the backward rotation region ($S_F < 0$). Although not shown, the gate firing circuit 24 functions to cause the rectifier operation mode when $V_{c\beta} > 0$ in the forward rotation, the inverter operation mode when $V_{c\alpha} < 0$ in the forward rotation, the inverter operation mode when $V_{c\beta} > 0$ in the backward rotation and the rectifier operation mode when $V_{c\beta} < 0$ in the backward rotation. In actuality, in response to the reversal of the velocity $S_F$, the control lagging angle $\alpha$ may be controlled in accordance with the magnitude of $V_{c\beta}$ instead of controlling the control leading angle $\beta$ in accordance with the magnitude of $V_{c\beta}$. As a result, $V_{c\beta}$ does not change at the time $t_{10}$ but the thyristor 21 is switched to the inverter operation mode at that moment. At the time $t_{10}$, $V_{c\alpha}$ is automatically shifted to the rectifier region because the D.C. current I is determined by the difference between the voltages across the two converters and hence the control voltage $V_{c\alpha}$ follows the change across the converter 21 in order to provide the current in accordance with the velocity in the control units A and B. As the thyristor 21 is operated in the inverter operation mode, $V_{c\alpha}$ is necessarily shifted to the rectifier region. In this manner, the motor rotation is reversed and accelerated in the reverse direction (backward torque operation).

The deceleration in the backward rotation at a time $t_{11}$ is then discussed. At this time, the signal T, which is "1" in the forward torque period, is now "1". The forward torque means a torque in the acceleration direction of the motor in the forward rotation of the motor, and hence in the backward rotation of the motor a torque in the deceleration direction of the motor is the forward torque. Consequently, the signal T is "1" only during the period of $t_{11} - t_{12}$. The signal F, which is "1" in the forward rotation period, is "0" over the entire region in the backward rotation period. In response to the condition of $|S_R| < |S_F|$, the backward rotation regenerating operation starts. First, the output of the velocity processing circuit 101 changes and $V_{c\alpha}$ becomes negative to operate the thyristor 20 as the inverter. The signal A is "1" during the period of $t_{13} - t_{14}$ in which $V_{c\alpha} < e_1$. On the other hand, $V_{c\beta}$ is positive and hence $B_1$ and $B_2$ are both "1". Under this condition, the output b of the NOR circuit 211 represented by the equation (2) is "1" because T, $\overline{F}$, $\overline{A}$, $B_1$ and $B_2$ are all "1", and it remains "1" from the time $t_{11}$ at which the velocity has been changed to the time $t_{13}$ at which the condition of $V_{c\alpha} < e_1$ is met. The NOR circuit 212 produces a "1" output only when the outputs of the two NOR circuits 210 and 211 are both "0", and hence it is "0" during the period of $t_{11} - t_{13}$. Since the output T is "1" during the period of $t_{11} - t_{12}$, the output $T_B$ (FIG. 6)

is "1" if the output k of the NOR circuit 212 is "1". Since the output k of the NOR circuit 212 is "1" after the time $t_{13}$, the output $T_\beta$ becomes "1" and the switching circuit 111 gates the output of the adder circuit 107 as $V_{c\beta}$. Since the output of the adder circuit 107 is negative, $V_{c\beta}$ is negative and the thyristor 21 is rapidly switched to the rectifier operation mode. Since $V_{c\beta}$ is negative, $B_1$ and $B_2$ are "0".

Finally, at the time $t_{12}$, when the operation is again switched to the motoring operation mode, the output T is "0" and the output $T_\beta$ is "0" and $V_{c\beta}$ is positive so that the thyristor 21 is switched to the inverter operation mode. As $V_{c\beta}$ becomes positive, $B_1$ and $B_2$ change to "1". During the period of $t_{12}-t_{15}$, the output of the NOR circuit 213 is "1", and at the time $t_{15}$, $T_\alpha$ is reset to "0". As a result, the switching circuit 103 gates the output of the inverter circuit 102 and $V_{c\alpha}$ becomes positive. Thereafter, the thyristor 20 is operated in the rectifier operation mode.

As described in detail hereinabove, the commutatorless motor of the present invention effects the switching between the motoring operation and the regenerating operation. As is apparent from the operation timing chart of FIG. 8, every switching occurs after it has been confirmed that the control voltage for the thyristor which had been in the rectifier region was shifted to the inverter region. That is, in the case where the thyristor 20 has been operated in the rectifier operation mode, the condition of $V_{c\alpha} < e_1$ is confirmed by the signal A and then the output $T_\beta$ is changed (from "1" to "0" for the forward rotation and from "0" to "1" for the backward rotation), and in the case where the thyristor 21 has been operated in the rectifier operation mode, the condition of $V_{c\beta} < e_3$ is confirmed by the signal $B_2$ and then the signal $T_\alpha$ is changed (from "0" to "1" for the forward rotation and from "1" to "0" for the backward rotation). Thus, the present system affords high speed switching in comparison with the prior art system in which the condition of $I_{FB}=0$ is detected and hence it can improve the response time of the commutatorless motor. By way of example, the switching time required is in the order of 50 milliseconds.

Figure 9:
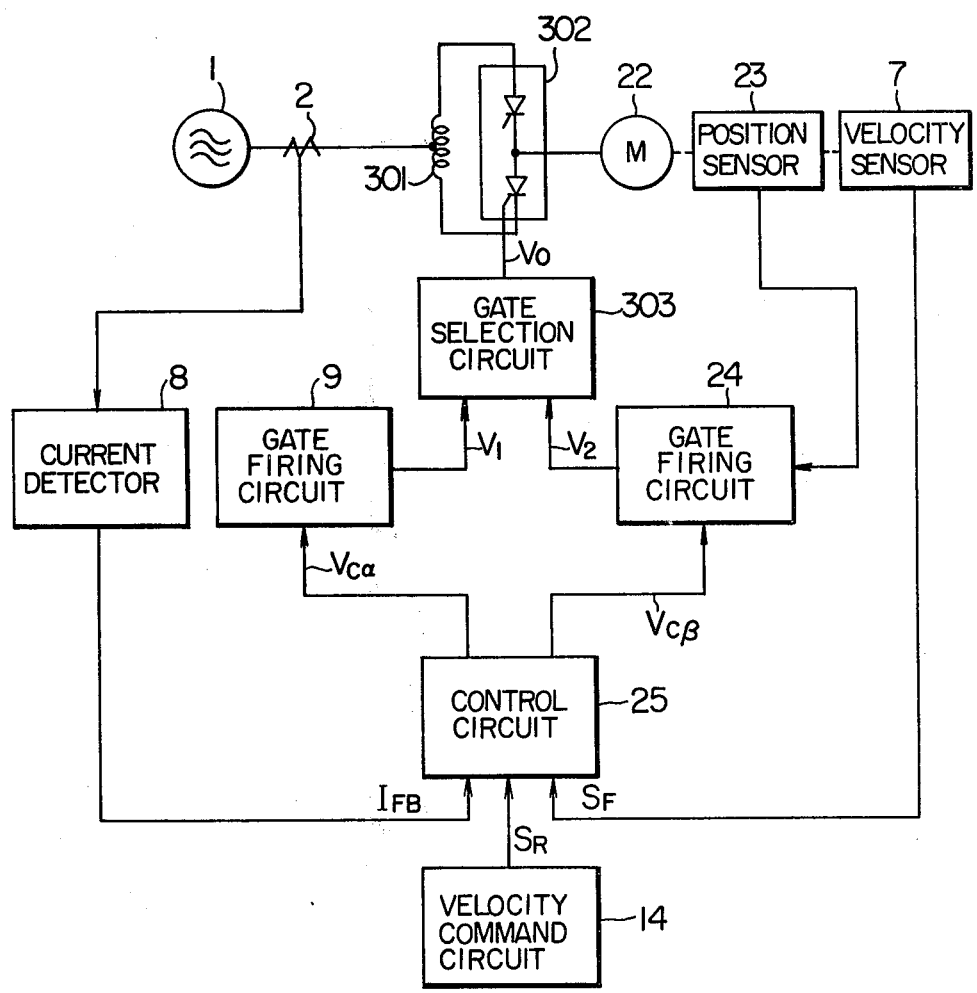
FIG. 9 shows a schematic diagram of a main circuit and a control circuit therefor of an A.C. link type commutatorless motor.
Figure 10:
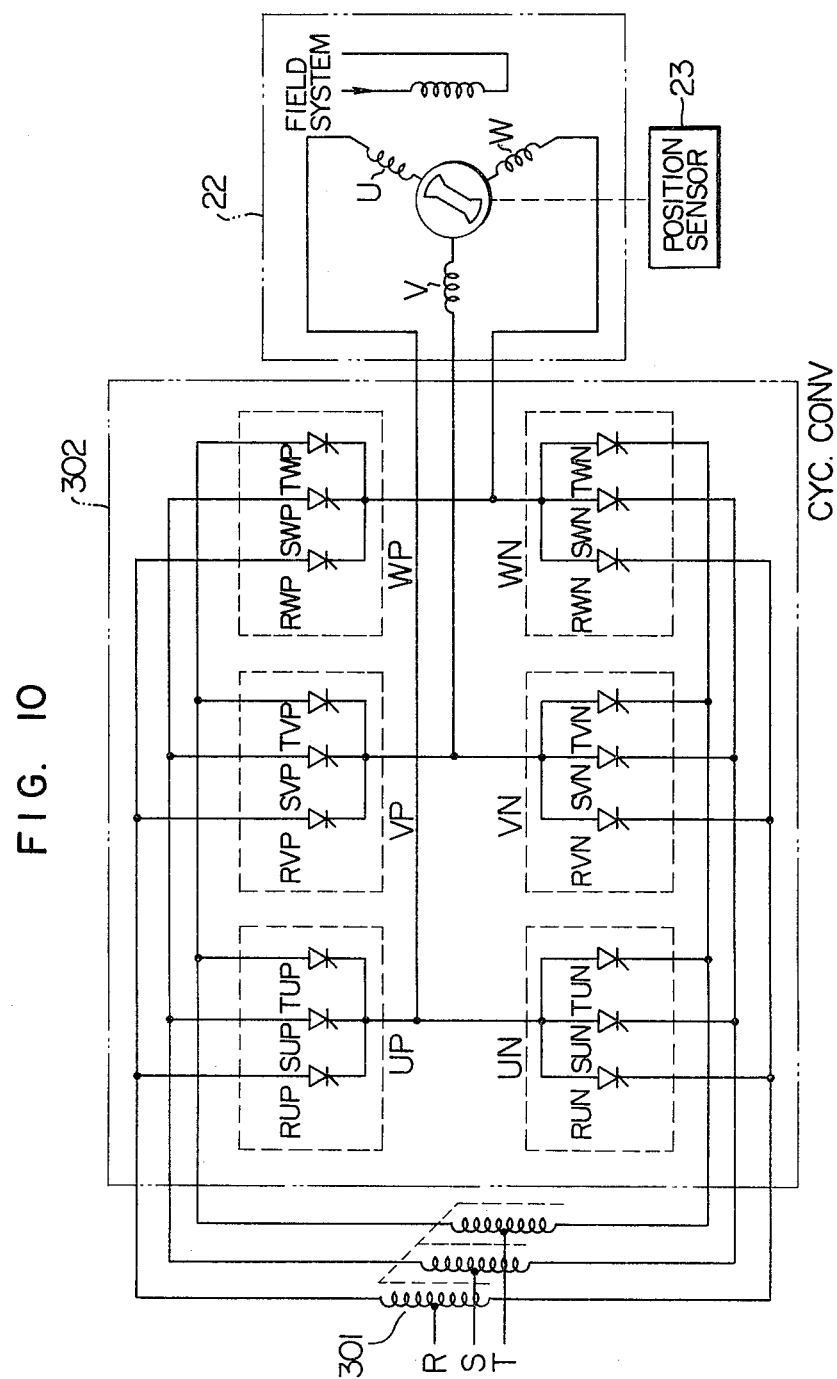
FIG. 10 shows a detailed configuration of the A.C. link type commutatorless motor.

An application of the present system to an A.C.-link type commutatorless motor is now explained. FIG. 9 shows a schematic diagram of a main circuit and a control circuit therefor, in which reference numerals 301, 302 and 303 denote a filtering reactor, a cyclo-converter and a gate selection circuit respectively. The cyclo-converter 302 and the filtering reactor 301 are connected as shown in FIG. 10. In the cyclo-converter 302, as is well known, UP, VP and WP denote positive thyristor groups, UN, VN and WN denote negative thyristor groups, and U, V and W denote phases of the motor 22. The gate firing circuit 24 produces a firing signal $V_2$ in response to the phase of the output of the position sensor 23 and applies the signal $V_2$ to one of the positive groups and one of the negative groups. In normal control, any of the positive groups is not in phase with any of the negative groups. Each of the groups includes three thyristors which are connected to R, S and T phases, respectively, of the power supply. The highest position of the symbol designated to each thyristor represents the phase of the power supply and the lower two positions represent the respective group. The gate firing circuit 9 produces a firing signal $V_1$ in response to the phase of the power supply, and if the firing time is of R-phase, for example, the firing signal $V_1$ is applied to all of the R-phase thyristors in the cyclo-converter 302. The gate selection circuit 303, which is an AND circuit, provide a logical product of the signals $V_2$ and $V_1$ to produce a firing signal $V_o$ which is applied to only those power supply thyristors selected by the signal $V_1$ in the group determined by the signal $V_2$. The duration of the signal V corresponds to the overlapped portion of the signals $V_1$ and $V_2$. Accordingly, the firing phase of each thyristor is determined by the firing phase of $V_1$ and the firing phase of $V_2$. The AND circuit 303 is not directly related to the present invention and it may be constructed in any appropriate manner.

The control circuit 25 for the A.C.-link type commutatorless motor may be constructed as shown in FIGS. 4, 5 and 6 to attain the same effect as that attained by the D.C.-link type commutatorless motor.

Figure 11:
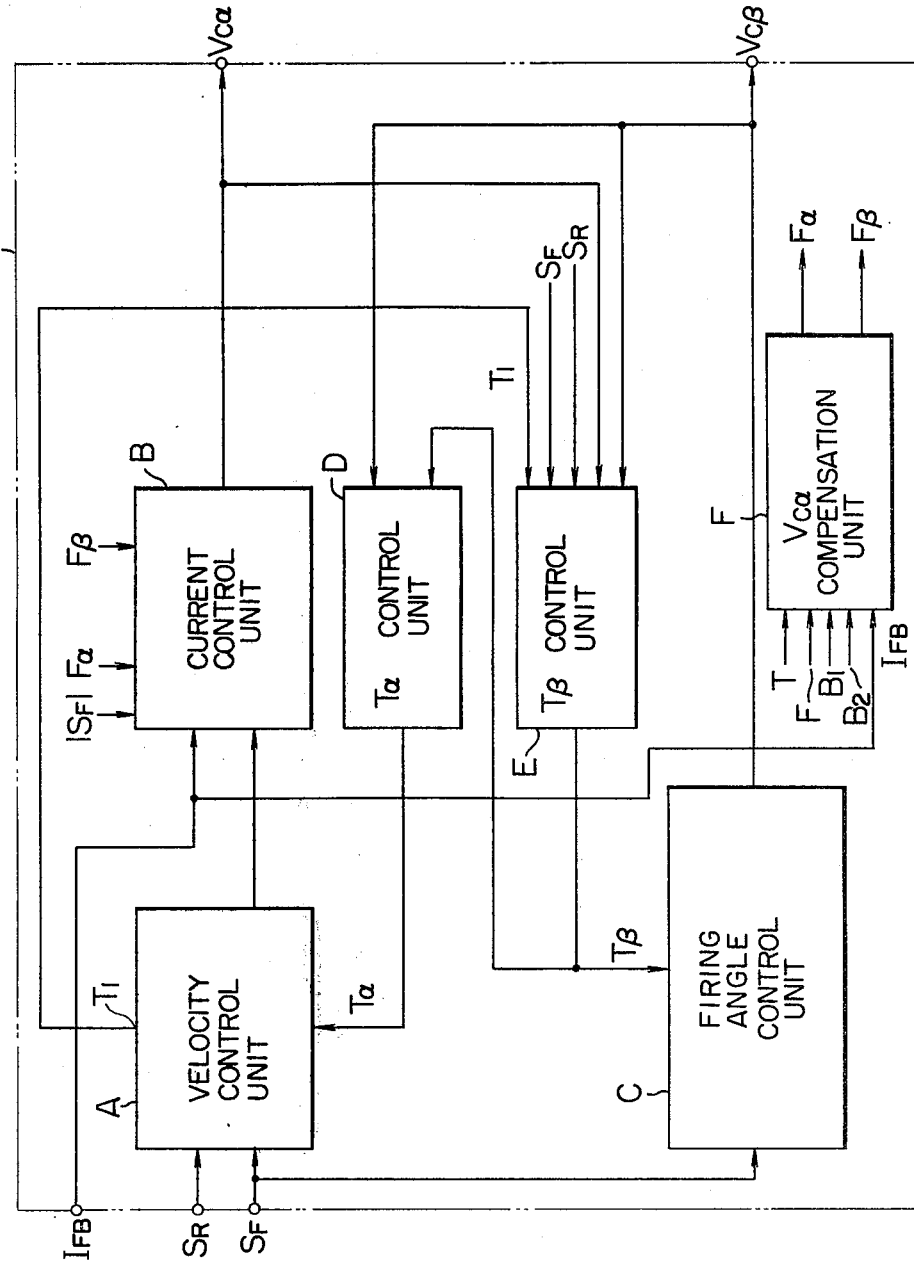
FIG. 11 shows a schematic diagram of a modification of the present invention which is additionally equipped with a compensation unit for forcibly changing $V_{c\alpha}$ when the operation mode is switched.
Figure 12:
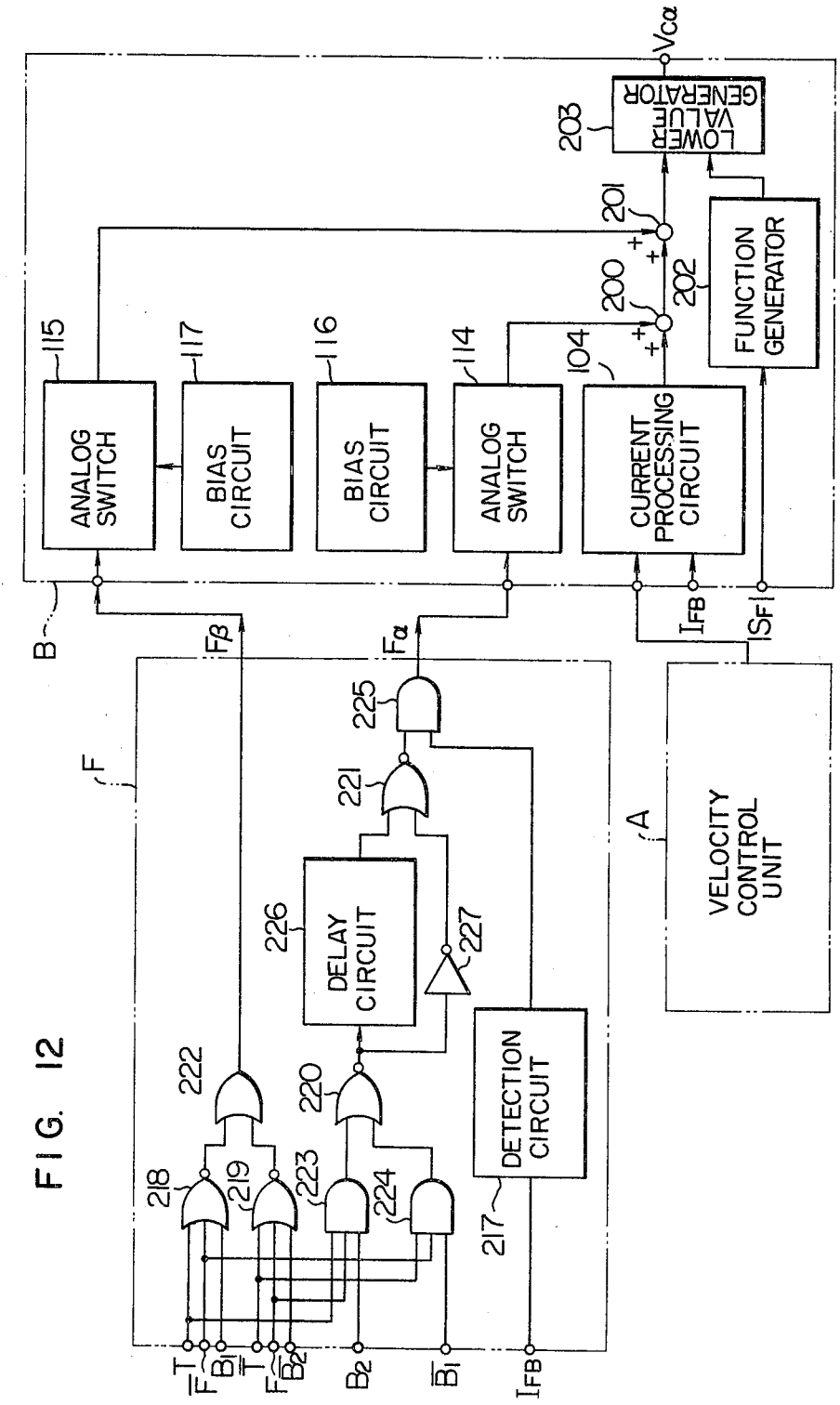
FIG. 12 shows a detailed diagram of a characteristic portion (current control unit B and $V_\alpha$ compensation unit F) of the modification shown in FIG. 11.

Two modifications of the present system will be then explained. One modification is directed to rapidly change the control voltage $V_{c\alpha}$ in FIG. 8. FIG. 11 shows a schematic diagram of the modification which corresponds to FIG. 4. As is seen from FIG. 11, a $V_{a\alpha}$ compensation unit F receives the input signals T, F, $B_1$, $B_2$ and $I_{FB}$ and provides compensation signals $F_\alpha$ and $F_\beta$ to the current control unit B which receives an absolute velocity value signal $|S_F|$. The signals $|S_F|$, F, $B_1$, $B_2$ and T may be those supplied to the control units D and E, etc. FIG. 12 shows an embodiment of the control units B and F. In the control unit B, like in FIG. 4, the current processing circuit 104 receives the current command signal which is the output of the switching circuit 103 and the output $I_{FB}$ of the current detector 8 and processes them to supply a current representative of the velocity error "$S_R - S_F$" and produces the signal $V_{c\alpha}$ which is applied to the gate firing circuit 9. The function of the control unit F added to the system is now explained.

In order to cause the minimum value of the output of the current processing circuit 104 to correspond to the rotation speed, the output $|S_F|$ of the absolute value circuit 105 is applied to the control unit F. In addition, in order to shorten the switching time, the following two signals are applied to the current processing circuit 104. One is applied from a bias circuit 117 through an analog switch 115 which is turned on when the operation mode is switched in the forward rotation from the forward torque to the backward torque or in the backward rotation from backward torque to the forward torque, and the other is applied from a bias circuit 116 through an analog switch 114 which is turned on when the operation mode is switched in the forward rotation from the backward torque to the forward torque or in the backward rotation from the forward torque to the backward torque. Those two signals function to change the output signal $V_{c\alpha}$ faster than a time constant of the current processing circuit 104 when the torque is switched.

The generating function F for the signals $F_\alpha$ and $F_\beta$ is first explained. In FIG. 12, the reference numerals 218, 219, 220 and 221 denote NOR circuits, 223, 224 and 225 denote AND circuits, 222 denotes an OR circuit, 227 denotes an inverter circuit and 226 denotes a delay circuit. The signal $F_\beta$ is produced when one of the NOR circuits 218 and 219 produces a "1" output. Each of the NOR circuits 218 and 219 is "1" when all inputs thereto are "0". While the changes of the signals at various points in FIG. 12 with respect to time are not shown, the changes of all of the inputs are shown in FIG. 8 and hence reference is made to FIG. 8 in the following description. The NOR circuit 218 effects a NOR function of the input signals $T_1$, $\overline{F}$ and $B_1$ and produces a "1" signal when the operation mode is changed in the forward rotation from the forward torque to the backward torque (at the time $t_1$ or $t_9$) as shown in FIG. 9, that is, during the period from the time $t_1$ when the output T of the inverter circuit 213 changes from "1" to "0" to the time $t_5$ when the output $B_1$ of the detection circuit 208 changes from "0" to "1". The NOR circuit 219 effects a NOR function of the output signals $\overline{T}$, F and $\overline{B}_2$ and produces a "1" signal when the operation mode is changed in the backward rotation from the backward torque to the forward torque (at the time $t_{11}$), that is, during the time period from the time$_{11}$ when the output T of the inverter circuit 213 changes from "0" to "1" to the time $t_{16}$ when the output $B_2$ of the inverter circuit 205 changes from "1" to "0". The OR circuit 222 produces the "1" signal $F_\beta$ when the output of the NOR circuit 218 or 219 is "1" to turn on the analog switch 115 to rapidly change the output $V_{c\alpha}$ of the current processing circuit 104 to the minimum value for switching the thyristor 20 to the inverter operation mode. At this time, the bias circuit 117 produces a negative bias signal. The AND circuit 223 effects an AND function of the output signals T, F and $B_2$ to produce a "1" signal during the time period $t_2-t_8$ in which the operation mode is changed in the forward rotation from the backward torque to the forward torque. The AND circuit 224 effects an AND function of the output signals $\overline{T}$, $\overline{F}$ and $B_1$ to produce a "1" signal during the time period $t_{12}-t_{15}$ in which the operation mode is switched in the backward rotation from the forward torque to the backward torque. The NOR circuit 220 effects a NOR function of the outputs of the AND circuits 223 and 224 to produce a "0" signal only during the periods $t_2-t_8$ and $t_{12}-t_{15}$. The delay circuit 226 delays the output of the NOR circuit 220 by the time $T_D$. The inverter circuit 227 inverts the output of the NOR circuit 220 to produces a "1" signal when the output of the NOR circuit 220 is "0". The NOR circuit 221 effects a NOR function of the outputs of the delay circuit 226 and the inverter circuit 227 to produce a "1" signal when both inputs thereto are "0". Thus, when the operation mode is switched in the forward rotation from the backward torque to the forward torque, the NOR circuit 221 produces the "1" signal during the time period of $T_D$ from the time $t_8$ when the output $B_2$ changes from "1" to "0". When the operation mode is switched in the backward rotation from the forward torque to the backward torque, the NOR circuit 221 produces the "1" signal during the time period of $T_D$ from the time $t_{15}$ when the output $\overline{B}_1$ changes from "0" to "1". In the above description, the times $t_8$ and $t_{15}$ denote the time points at which $V_{c\alpha}$ is reset from the inverter region to the rectifier region, as is apparent from FIG. 8. The AND circuit 225 effects an AND function of the output of the NOR circuit 221 and the output of the detection circuit 217 to produce the "1" signal $F_\alpha$ only during the time period $T_D$ and when $I_{v\beta}$ is below a reference value $e_4$, to turn on the analog switch 114 to apply a positive bias to the current processing circuit 104 so that the output $V_{c\alpha}$ of the current processing circuit 104 rapidly increases and rapidly switch the thyristor 20 to the rectifier operation mode. When $I_{F\beta}$ $e_4$, the rapid increase of $V_{c\alpha}$ (forcing) is inhibited. This is because the voltage across the thyristor 20 is sufficiently higher than the voltage across the thyristor 21 and the thyristor 20 is operating in the rectifier region so that no further forcing is necessary. In this manner, the output $F_\beta$ of the OR circuit 222 and the output $F_\alpha$ of the AND circuit 225 function to cause the switching of the torque to occur rapidly rather than by the operating time constant of the velocity processing circuit 101 and the current processing circuit 104 so that the switching time is shortened.

Reference numeral 202 denotes a function generator which produces an output indicative of the absolute value $|S_F|$ of the velocity, and 203 denotes a lower value generator which prevents $V_{c\alpha}$ from falling below a value corresponding to the velocity for preventing the motor operation from becoming unstable due to the rapid reduction of $V_{c\alpha}$ in the control system. By the addition of the embodiment of FIG. 12, a higher switching can be attained.

Figure 13:
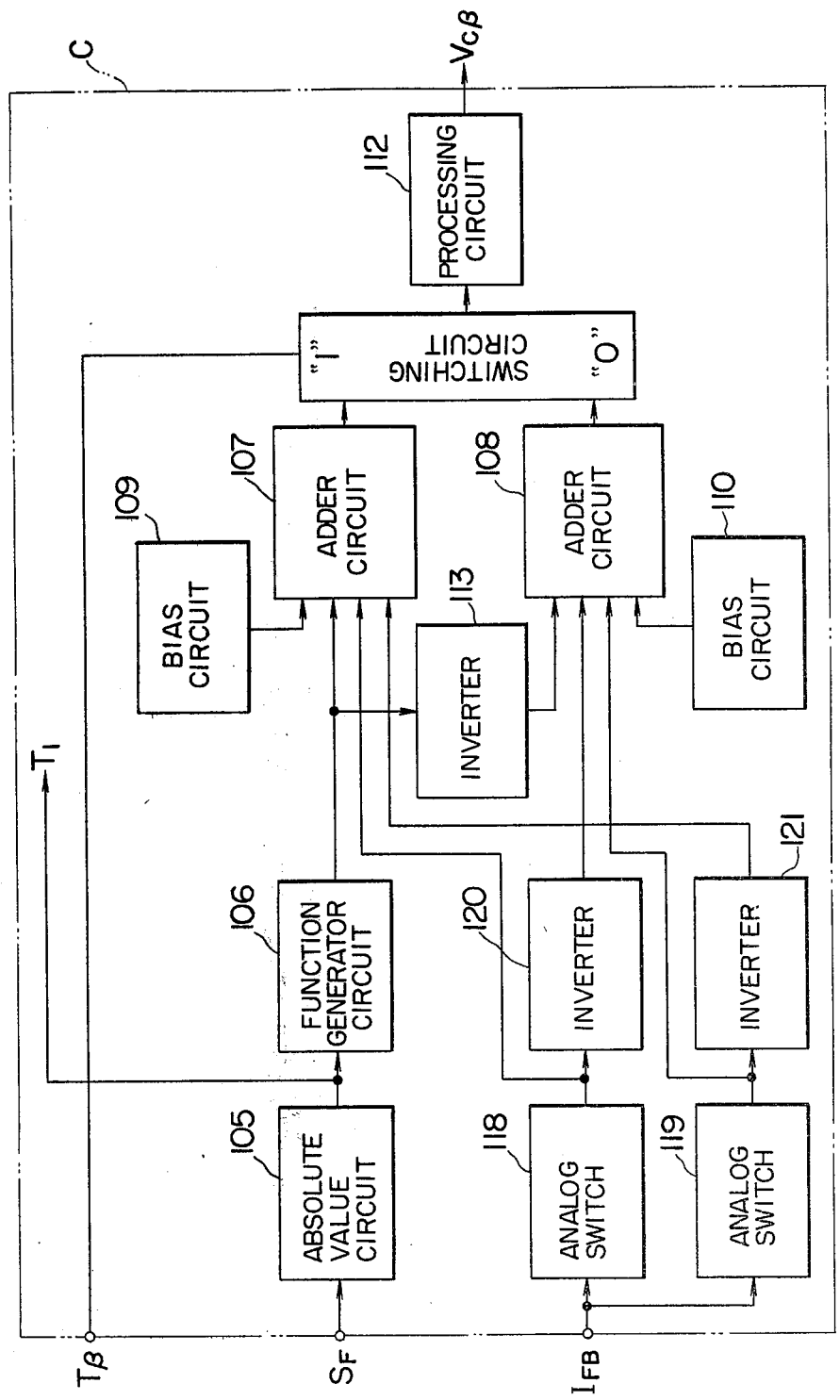
FIG. 13 shows a specific configuration of another modification in which an output $V_{c\beta}$ of a firing angle control unit C is variable with a current $I_{FB}$.

FIG. 13 shows another modification which is designed to prevent commutation failure of the thyristor 21. The firing angle control unit C shown in FIG. 4 determines the control leading angle $\beta$ in accordance with the actual velocity $S_F$. In FIG. 13, the control leading angle $\beta$ is variable depending on the load current in the motoring operation or the regenerating current in the regenerating operation so that an optimum control leading angle is attained under any operating condition.

In FIG. 13, reference numerals 118 and 119 denote analog switches, and 120 and 121 denote inverter circuits. The analog switch 118 is turned on during the motoring operation (forward torque in forward rotation or backward torque in backward rotation to apply the current signal $I_{FB}$ to the adder circuit 107 and apply the signal $-I_{FB}$ which has been inverted by the inverter circuit 120 to the adder circuit 108. The analog switch 119 is turned on during the regenerating operation (backward torque in forward rotation or forward torque in backward rotation) to apply the current signal $I_{FB}$ to the adder circuit and apply the signal $-I_{FB}$ which has been inverted by the inverter circuit 121 to the adder circuit 107. In this manner, the output $V_{c\beta}$ of the processing circuit 112 is changed in accordance with the current to increase the control leading angle $\beta$ of the thyristor converter 21 so that the commutation failure of the thyristor converters 20 and 21 is prevented.

The improvement of the characteristic shown in FIG. 7F by the circuit of FIG. 13 is briefly explained. In the forward rotation motoring operation, the analog switch 118 is turned on and the switching circuit 111 gates the output of the adder circuit 107 to apply the positive bias. Therefore, the characteristic curve is moved in parallel in the direction of a at the current $I_{FB}$ increases. In the forward rotation regenerating operation, the analog switch 119 is turned on and the switching circuit 111 gates the output of the adder circuit 108 to apply the positive bias. Accordingly, the characteristic curve is moved in parallel in the direction of b as the current $I_{FB}$ increases. In the backward rotation motoring operation, the analog switch 118 is turned on and the switching circuit 111 gates the output of the adder circuit 108 to apply the negative bias. Therefore, the characteristic curve is moved in parallel in the direction of c. In the backward rotation regenerating operation, the analog switch 119 is turned on and the switching circuit 111 gates the output of the adder circuit 107 to apply the negative bias. Accordingly, the characteristic curve is moved in parallel in the direction of d.

While two modification have been shown and described, they are applicable to both the A.C.-link type and the D.C.-link type.

In the above description, after it has been confirmed that the control voltage has been shifted to the inverter region, the other converter is switched to the rectifier operation mode. This may be substituted by another signal equivalent to the control voltage. As an example, a signal derived by directly detecting the firing angle may be monitored, or in another example, the polarity reversal of the D.C. voltage across the converter may be used as a trigger signal to switch the other converter to the rectifier operation mode because there is no substantial time delay between the control voltage and the converter voltage. The latter case, however, is expensive because a D.C. voltage transformer is necessary at each D.C. terminal and, in the case of the A.C.-link type, it is not possible by the nature of construction to derive the D.C. terminal voltage or corresponding system voltage.

I claim:

1. A control system for a commutatorless motor comprising a pair of AC-DC converters respectively connected to opposite ends of a DC line, an AC source connected to one of said pair of AC-DC converters at its side, the commutatorless motor connected to the other AC-DC converter at its AC side, a pair of control means respectively connected to said pair of AC-DC converters each of which produces a control voltage signal so as to control a firing angle of the associated one of said AC-DC converters in accordance with said control voltage signal to thereby control the rotary speed of said motor, said one and the other AC-DC converters being actuated to operate rectifier conversion and inverter conversion respectively when said motor is operated in a motoring mode and alternatively being actuated to operate inverter conversion and rectifier conversion respectively when said motor is operated in a regenerating mode, the improvement wherein each of said pair of control means includes first means for producing said control voltage signal and for causing the firing angle of the associated AC-DC converter to alternatively take a value within its rectifier conversion region and a value within its inverter conversion region in accordance with said control voltage signal, second means for detecting change-over in the firing angle of the associated AC-DC converter from a value of its rectifier conversion region to a value of its inverter conversion region and third means for changing the control voltage signal produced by said first means to take such a value that causes the firing angle of the associated AC-DC converter to change-over from a value within its inverter conversion region into a value within its rectifier conversion region in response to an output of the second means of the other one of said pair of control means.

2. A control system for a commutatorless motor according to claim 1, wherein said second means of each of said pair of control means produces an output when it detects the fact that the control voltage signal produced by said first means of the same control means changes over from a value within its rectifier conversion region into a value within its inverter conversion region.

3. A control system for a commutatorless motor according to claim 1, wherein said second means of each of said pair of control means produces an output when it detects the fact that the polarity of a voltage at the DC side of the associated AC-DC converter changes.

4. A control system for a commutatorless motor according to claim 1, wherein said first means of said control means connected to said one AC-DC converter includes a speed control circuit for producing said control voltage signal which is used to cause the firing angle of said one AC-DC converter to alternatively take a value within its rectifier conversion region and a value within its inverter conversion region in accordance with an error signal representing a deviation of an actual rotary speed of the motor from a command speed therefor, current detector means adapted to produce an output when it detects the fact that a current corresponding to a motor current is below a predetermined value, fourth means adapted to produce an output when it detects the fact that the firing angle of said one AC-DC converter changes over between a value within its rectifier conversion region and a value within its inverter convertion region, and fifth means for adding a bias signal to said control voltage signal of said first means when both the outputs of said fourth means and said current detector means are produced at the same time to thereby cause the change-over in the value of the firing angle to be quickly effected.

* * * * *